March 27, 1934.   G. B. DRYDEN   1,952,660
JAR OPENING DEVICE
Filed Nov. 3, 1932
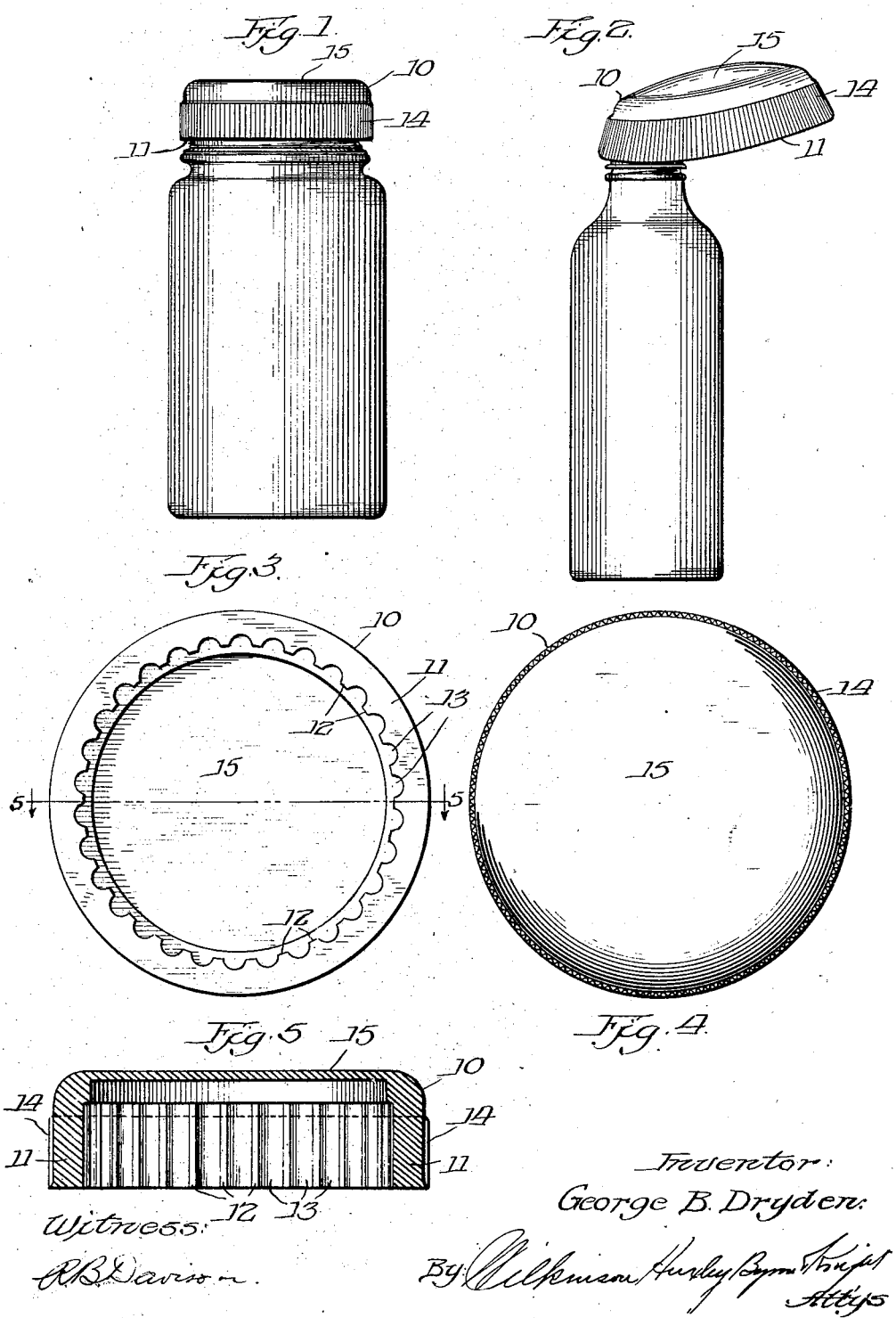

Patented Mar. 27, 1934

1,952,660

UNITED STATES PATENT OFFICE 1,952,660

JAR OPENING DEVICE

George B. Dryden, Evanston, Ill., assignor to Dryden Rubber Company, Chicago, Ill., a corporation of Illinois Application November 3, 1932, Serial No. 641,023

2 Claims. (Cl. 81—3.1)

My invention relates to a jar opening device, and has particular reference to a cap-shaped rubber device adapted to fit over the lid of a Mason type jar, with gripping means on the inside of the ring-shaped body portion adapted to grip the lid or cover when the device is placed in the palm of the hand and through force applied by the fingers and hand the operator is enabled to tightly grip the lid of the jar for the purpose of either removing or tightening the lid.

Another and further object of my invention is the provision of a device which, while capable of being used with and adapted to fit the top of a Mason type jar, is flexible and can be used for removal of tops from bottles much smaller than the usual Mason type jar, by flexing the device and gripping it preferably between the thumb and forefinger so that the bottle stopper or cork is gripped tightly.

Another and further object of my invention is the provision of a jar opening device made of rubber or other flexible material which is cap-shaped in form and adapted to fit over the cover of a Mason type jar or other smaller article, and which is provided at the inner side of the ring-shaped body portion with a plurality of truncated ribs which readily enable the device to be pressed tightly against the surface of the lid or stopper and to grip with less force than would be required otherwise to prevent slippage of the device.

Another and further object of my invention is the provision of a jar opening device having a body portion, the walls of which are comparatively heavy to form adequate protection to the hand while gripping the jar, with a thin flexible top portion being provided to protect the hand of the operator against injury or possibility of being cut should the stopper or cover of the jar slip while the jar is being held. The top portion is extremely thin and flexible so that it does not interfere with the flexibility and operativeness of the body portion of the device.

Another and further object is the provision of a jar opening device having a closed upper portion which protects the hands of the operator from heat, particularly when it is desired to tighten the tops of jars after they have been filled with hot fruit during canning operations.

These and other objects of my invention will be more fully and better understood by reference to the accompanying sheet of drawing and in which—

Figure 1 is an elevational view showing the usual type of Mason jar with my removing device on the cover thereof;

Figure 2 is an elevational view showing the device applied to a bottle;

Figure 3 is an upper plan view of the device;

Figure 4 is a top plan view; and

Figure 5 is a cross sectional view on lines 5—5 of Figure 3.

Referring now specifically to the drawing and in which like reference characters refer to like parts throughout, a cap device 10 is shown having a ring-shaped body portion 11 adapted to encircle the top of the cover or lid of a Mason type jar. On the inner side of the ring-shaped body portion 11 is a plurality of truncated spaced ribs 12—12 with arcuate-shaped spaced recesses 13, 13 formed between each of the ribs 12, 12. The ribs, as will be noticed, are comparatively narrow at their tops with substantially right angle gripping edges being formed on each side of the ribs, while the ribs, because of the arcuate-shaped recesses between them, have their bases considerably wider than the tops thereby enabling the ribs to wear longer and making them much stronger. At the same time there is little danger of these ribs breaking off or being injured, thereby destroying the efficiency of the device.

On the outer side of the wall portion 11 is formed a plurality of vertically extending ribs 14, 14 to provide gripping means for the hand on the outside of the ring-shaped wall portion 11. Formed integrally with the ring-shaped wall portion 11 is a top portion 15 which forms a complete top for the device and protection for the hand of the operator while using the device, thereby protecting the hand against injury should breakage result, and also acting as a protecting member to prevent burning of the hand in handling a hot bottle or jar.

In operation the device is comparatively simple in that the diameter of the ring-shaped member 14 is very slightly larger than the usual standard screw top used on a Mason type jar so that the device is fitted over the top of the jar and the jar held in one hand while the lid or top is turned by means of the opening device with the other hand. The ribs 12 on the inside of the ring-shaped member grip the outer surface of the jar cover so that a slight pressure of the operator's hand is sufficient to hold the lid tightly during the turning operation, avoiding the usual difficulty in turning these covers by hand, in that no force is required to prevent the hand from slipping than is required to turn the lid. The jar or receptacle is, of course, held in the other hand during this operation.

If it is desired to use the device on a small bottle the opening device is placed in the palm of the hand and the cork or fastening member gripped preferably between the thumb and first finger of the hand at one side of the device, in which case the opening device flexes to such an extent that an easy grip is obtained enabling the cork or cover to be opened or closed.

The device is particularly useful in opening small bottles provided with the usual screw-threaded cap members now in common use. These members are usually cork lined to prevent leakage and when turned up tightly require a great deal of force to remove them.

While I have described more or less precisely the details of construction, I do not wish to be understood as limiting myself thereto, as I contemplate changes in form and the proportion of parts and substitution of equivalents as circumstances may suggest or render expedient without departing from the spirit or scope of my invention.

I claim:

1. A jar opening device, comprising a cup-shaped member fashioned entirely of flexible, resilient, pliable material having an annular side wall portion having a plurality of vertically extending spaced truncated ribs having relatively broad base portions thereon, and having a relatively thin top portion formed integrally with the side wall portion.

2. A jar opening device, comprising a cup-shaped member fashioned entirely of a flexible, resilient, pliable material having a comparatively heavy annular side wall with a plurality of arcuate shaped recesses therein with vertically extending truncated ribs having relatively broad base portions formed therebetween, and having a top portion formed integrally with said side wall, the said top portion being relatively thin with respect to said annular side wall.

GEORGE B. DRYDEN.